US012759749B2

(12) United States Patent
Lundgren-Goodman et al.

(10) Patent No.: US 12,759,749 B2
(45) Date of Patent: Oct. 13, 2026

(54) COMPOSITE PAPERBOARD CONTAINER WITH A RIM COMPRISING FIBERS, AND A METHOD FOR PRODUCING SUCH A CONTAINER

(71) Applicant: GPI Systems AB, Lund (SE)

(72) Inventors: Maximillian Lundgren-Goodman, Lomma (SE); Georg Gezelius, Malmo (SE)

(73) Assignee: GPI Systems AB, Lund (SE)

( * ) Notice: Subject to any disclaimer, the term of this patent is extended or adjusted under 35 U.S.C. 154(b) by 623 days.

(21) Appl. No.: 18/033,591

(22) PCT Filed: Oct. 14, 2021

(86) PCT No.: PCT/SE2021/051009
§ 371 (c)(1),
(2) Date: Apr. 25, 2023

(87) PCT Pub. No.: WO2022/093089
PCT Pub. Date: May 5, 2022

(65) Prior Publication Data

US 2023/0399139 A1 Dec. 14, 2023

(30) Foreign Application Priority Data

Oct. 28, 2020 (SE) .................................... 2051256-2

(51) Int. Cl.
*B65D 3/12* (2006.01)
*B32B 27/10* (2006.01)
(Continued)

(52) U.S. Cl.
CPC ................ *B65D 3/12* (2013.01); *B32B 27/10* (2013.01); *B32B 27/32* (2013.01); *B65D 43/169* (2013.01);
(Continued)

(58) Field of Classification Search
CPC ... B65D 3/10; B65D 3/28; B65D 3/04; B65D 3/12; B65D 3/268; B65D 3/30;
(Continued)

(56) References Cited

U.S. PATENT DOCUMENTS 1,249,095 A 12/1917 Hulbert
1,454,846 A * 5/1923 Coates ..................... B65D 3/10
229/5.8
(Continued)

FOREIGN PATENT DOCUMENTS

CN 86104594 A 6/1987
CN 105836310 A 8/2016
(Continued)

OTHER PUBLICATIONS

Supplementary European Search Report for EP 21 88 7036 dated Aug. 6, 2024.

(Continued)

*Primary Examiner* — Christopher R Demeree
(74) *Attorney, Agent, or Firm* — Andrew N. Claerbout; FisherBroyles, LLP

(57) ABSTRACT

The present disclosure relates to a composite paperboard container for bulk solids having a tubular body being closed at a bottom end over a container bottom opening opposite a container top opening at a top end. The rim is attached at a connecting portion of the rim to an end portion of the tubular body along an end edge of the tubular body. The connecting portion of the rim has a distal edge. The rim is a molded rim comprising pulp fibers. The tubular body is connected by welding to the connecting portion of the rim and the distal edge of the rim is located at a distance from the end edge of the tubular body.

13 Claims, 8 Drawing Sheets

(51) Int. Cl.
*B32B 27/32* (2006.01)
*B65D 43/16* (2006.01)

(52) U.S. Cl.
CPC .............. *B65D 2543/00101* (2013.01); *B65D 2543/00268* (2013.01); *B65D 2543/00435* (2013.01); *B65D 2543/00518* (2013.01); *B65D 2543/00537* (2013.01); *B65D 2543/00555* (2013.01)

(58) Field of Classification Search
CPC ................ B65D 43/163; B65D 43/169; B65D 2543/0068; B31B 50/62; B31B 2110/20; B31B 2105/00
USPC .......................................................... 229/100
See application file for complete search history.

(56) References Cited

U.S. PATENT DOCUMENTS

| | | | | |
|---|---|---|---|---|
| 1,456,424 | A * | 5/1923 | Coates | B65D 5/12 229/5.8 |
| 2,118,591 | A | 5/1938 | Clark | |
| 2,302,083 | A | 11/1942 | Wilcox | |
| 2,470,984 | A | 5/1949 | Horning | |
| 2,681,742 | A | 6/1954 | Miller | |
| 3,971,489 | A | 7/1976 | Welch et al. | |
| 4,620,640 | A | 11/1986 | Swartzbaugh | |
| 5,687,865 | A | 11/1997 | Adams et al. | |
| 5,743,422 | A | 4/1998 | Hale | |
| 5,810,188 | A | 9/1998 | Novakoski | |
| 6,050,441 | A | 4/2000 | Kuo | |
| 11,697,528 | B2 * | 7/2023 | Dahlin | B65D 51/20 220/254.1 |
| 2003/0028165 | A1 * | 2/2003 | Curro | B29C 66/7294 604/383 |
| 2004/0055992 | A1 | 3/2004 | Robinson et al. | |
| 2009/0230177 | A1 | 9/2009 | Robertson | |
| 2009/0283526 | A1 | 11/2009 | Pierce et al. | |
| 2012/0037213 | A1 | 2/2012 | Cheng | |
| 2015/0251826 | A1 | 9/2015 | Lee et al. | |
| 2016/0000270 | A1 | 1/2016 | Wiggins et al. | |
| 2016/0177045 | A1 | 6/2016 | Krist | |
| 2017/0021995 | A1 * | 1/2017 | Corbett | B65D 25/02 |
| 2017/0247151 | A1 | 8/2017 | Chiou | |
| 2018/0016038 | A1 | 1/2018 | Herlin et al. | |
| 2018/0020876 | A1 | 1/2018 | Herlin et al. | |
| 2020/0032460 | A1 * | 1/2020 | Lin | B65D 43/0208 |

FOREIGN PATENT DOCUMENTS

| | | | | |
|---|---|---|---|---|
| CN | 105857880 | A | 8/2016 | |
| CN | 106061856 | A | 10/2016 | |
| CN | 107000856 | A | 8/2017 | |
| CN | 107406172 | A | 11/2017 | |
| DE | 86 04 128 | U1 | 3/1986 | |
| DE | 8604128 | | 3/1986 | |
| DE | 20 2005 009 426 | U1 | 8/2005 | |
| EP | 2 399 840 | A1 | 12/2011 | |
| EP | 2 527 265 | A1 | 11/2012 | |
| EP | 2527265 | | 11/2012 | |
| EP | 4 011 798 | A1 | 6/2022 | |
| JP | 3153084 | U | 8/2009 | |
| JP | 6770787 | | 10/2020 | |
| JP | 6770787 | B1 | 10/2020 | |
| KR | 20-0385831 | Y1 | 6/2005 | |
| SE | 1851334 | A1 | 4/2020 | |
| TW | 201425157 | A | 7/2014 | |
| WO | WO 02/34824 | A2 | 5/2002 | |
| WO | 2016126191 | A1 | 8/2016 | |
| WO | WO 2016/126193 | A1 | 8/2016 | |
| WO | WO 2016/195616 | A1 | 12/2016 | |
| WO | 2017089508 | | 6/2017 | |
| WO | WO 2017/089508 | A1 | 6/2017 | |
| WO | 2017180056 | A1 | 10/2017 | |
| WO | WO 2017/204731 | A1 | 11/2017 | |
| WO | WO-2019156617 | A1 * | 8/2019 | B65D 43/169 |
| WO | WO 2020/016409 | A1 | 1/2020 | |

OTHER PUBLICATIONS

International Search Report and Written Opinion for PCT/SE2021/051009 dated Nov. 10, 2021.

* cited by examiner

COMPOSITE PAPERBOARD CONTAINER WITH A RIM COMPRISING FIBERS, AND A METHOD FOR PRODUCING SUCH A CONTAINER

CROSS-REFERENCE TO RELATED APPLICATIONS

The present application is a national stage entry under 35 U.S.C. § 371 of International Patent Application No. PCT/SE2021/051009, filed on Oct. 14, 2021, which claims the benefit of Swedish Patent Application No. 2051256-2, filed on Oct. 28, 2020.

INCORPORATION BY REFERENCE

The disclosures of each of International Patent Application No. PCT/SE2021/051009, filed on Oct. 14, 2021, and Swedish Patent Application No. 2051256-2, filed on Oct. 28, 2020, are hereby incorporated by reference for all purposes as if presented herein in their entirety.

TECHNICAL FIELD

The present disclosure relates to a composite paperboard container and a method of producing the composite paperboard container.

BACKGROUND OF THE INVENTION

In the area of disposable containers for products such as infant formula, tobacco, detergents, etc. there is an ongoing need of diminishing the carbon footprint of such products, by minimizing the resource use for the disposable containers as well as making the containers recyclable. The disposable containers referred to herein are composite containers having a tubular body which is made from a laminate sheet material comprising a carton layer, i.e. a layer made predominantly from cellulosic fibres. For certain containers, the upper and lower end edge of the container include a plastic rim connected to the edges of the packaging container. This provides the packaging containers with a pleasant and neat appearance and the container top or bottom may also be more wear resistant. To provide a container free from plastic components, the top and/or bottom portions of the container may alternatively be made from a folded-in end portion of the tubular body. The appearance may however for such packaging containers be somewhat less attractive and less wear resistant at the bottom end of the packaging container.

Paperbased materials have traditionally been considered less suitable for use in making covers and rims for paperboard containers as they have been considered to have low shape stability and to be less resistant to damage and wear than plastic components. It has also been difficult to attain secure and tight attachment to the paperboard container body of such components as well as a tight closure between a rim and a container lid.

There is consequently a need to provide further packaging for sensitive goods such as food products with improved recyclability, without sacrificing durability or packaging safety for the packaged goods.

SUMMARY OF THE INVENTION

The above object may be achieved with a composite paperboard container according to claim 1 and by a method of producing a composite paperboard container according to claim 11. Further advantages and advantageous features of the invention are disclosed in the following description and in the dependent claims According to a first aspect, the present disclosure relates to a composite paperboard container for bulk solids. The composite paperboard container comprising a tubular body being closed at a bottom end over a container bottom opening opposite a container top opening at a top end of the tubular body. The tubular body has an inner surface facing towards an interior of the container body and an outer surface facing away from the interior of the container body. The tubular body extends in a longitudinal direction. The composite container comprises a rim surrounding the container top opening and/or the container bottom opening. The rim is attached at a connecting portion of the rim to an end portion of the tubular body along an end edge of the tubular body. The connecting portion of the rim has a distal edge. The tubular body is made from a laminate sheet material comprising a carton substrate layer and a thermoplastic welding layer. The rim is a molded rim comprising pulp fibers, such as softwood pulp fiber. The tubular body is connected to the rim by welding the end portion of the tubular body to the connecting portion of the rim. The distal edge of the connecting portion is located at a distance from the end edge of the tubular body of at least 4 mm, as seen in the longitudinal direction of the tubular body.

The rim is a molded rim comprising pulp fibers, the molded rim may be constituted of from 95% to 100% of pulp fibers, such as softwood pulp fibers, optionally virgin softwood pulp fibers, optionally of from 98% to 100% of pulp fibers. Examples of such materials which have been developed for molding applications such as molded trays and blisters, shaped or embossed boxes, etc. are produced e.g. at Billerud Gruvön and sold as Billerud FibreForm®. A similar material is the Advantage Formable paper available from Mondi.

The tubular body of the composite paperboard container is made of a laminate sheet material comprising a carton substrate layer and an inner thermoplastic welding layer. The composite paperboard packaging container to which this disclosure relates is intended to store moisture-sensitive bulk solids, but is normally not intended to be stored in a cooled space, such as a refrigerator, and does therefore not need an outer polymeric resin layer such as polyethylene. The tubular body of this type of composite paperboard containers is however often provided with an outer coating composition, such as a varnish, to increase the wear resistance and to provide an aesthetically pleasing packaging container.

There is desire to provide packaging for sensitive goods such as food products with improved recyclability, without sacrificing durability or packaging safety for the packaged goods. However, since the rim is a molded rim comprising pulp fibers the structure may be less flexible and may also have a more irregular surface compared to a conventional plastic rim which may reduce the sealing tightness between the rim and the tubular paperboard body. Thereby, durability or packaging safety for packaged goods may be reduced since there could be a risk of air and/or moisture penetrating the space between the tubular body and the rim. It was however surprisingly found by the present inventor, that by providing a rim with a connecting portion extending at least 4 mm in the longitudinal direction from the end edge of the tubular body and welding the rim to the tubular body provided with an inner layer of a thermoplastic welding layer, a satisfying sealing tightness allowing packaging for sensitive goods such as food products could be achieved while yet providing a neat appearance at the bottom or upper container edge on an easily recyclable container. It has been found that a rim with a connecting portion extending at least 4 mm, in the longitudinal direction from the end edge of the tubular body, optionally of from 4 mm to 50 mm in the longitudinal direction from the end edge of the tubular body, optionally from 5 mm to 40 mm in the longitudinal direction from the end edge of the tubular body, provides an enhanced shape stability for the rim by means of the tubular body wall providing a support for the most fragile part of the rim, namely the connecting portion or connecting portions.

The rim is attached to an end portion of the tubular body and the end portion of the tubular body may either be around the container top opening or at the container bottom opening. The composite paperboard container may comprise a rim according to the present disclosure around both the container top opening and the container bottom opening.

The rim may be an inner rim and the composite paperboard container may furthermore comprise a lid component. The lid component may be a molded lid component comprising pulp fibers, such as softwood pulp fibers, and may be made from the same material and in the same manner as the inner rim. The lid component may comprise a lid part and an outer rim part, the outer rim part and the lid part may be moulded in one piece and be connected to each other via a hinge portion. The outer rim part is connectable to the inner rim. The outer rim component may be mechanically connected to the inner rim, such as by a snap-on connection, a slide-in connection etc.

The rim may alternatively be part of a rim and lid component, wherein the rim part and the lid part of the rim and lid component may be moulded in one piece, the rim part being connected to the lid part via a hinge portion and the wherein the rim part is welded to the tubular body.

The rim may be connected either to the inner surface or to the outer surface of the tubular body via the first connecting portion. The first connecting portion is a circumferential connecting portion extending around the entire circumference of the tubular body. The first connecting portion is connected to the tubular body along the entire end portion, to the inner and/or to the outer surface of the tubular body.

The rim may be provided with a thermoplastic layer on a surface facing the tubular body. A thermoplastic layer provides the rim with a less irregular surface and, thus, enhances sealing and improves durability or packaging safety for the packaged goods.

The paperboard packaging container may be provided with an inner transport closure being attached to an inner surface of the tubular body at the top end and at a distance from said the rim, the transport closure may be a fully or partially removable closure. A fully or partly removable transport closure may be gastight or gas-permeable. A gastight closure may be manufactured from any material or material combination suitable for providing a gastight sealing of a compartment delimited by the transport closure, such as aluminium foil, silicon-coated paper, plastic film, or laminates thereof. A gastight transport closure is advantageous when the bulk solids stored in the packaging container are sensitive to air and/or moisture, and it is desirable to avoid contact of the packaged bulk solids with ambient air. Since the transport closure is a removable closure, it does not have an impact on recyclability of the composite paperboard container.

The composite paperboard container may be free from plastic components, such as a plastic rim component, lid component or bottom component. Such composite paperboard container, thus, allows the user to recycle the container without first separating plastic components from the tubular body.

The rim may have a density within the range of from 0.2 to 1.5 kg/dm$^3$, optionally within the range of from 0.2 to 1 kg/dm$^3$, optionally within the range of from 0.4 to 0.8 kg/dm$^3$. The rim according to the present disclosure is a molded rim and therefore needs to have a structural durability, preferably a structural durability similar to a plastic rim. For rim components which are to be connected to an additional rim part, such as an inner rim component and an outer rim component, the rim components need to have a certain flexibility and to be and to be able to be structurally stable.

The rim may comprise a U-shaped or a square edge U-shaped track portion, as seen in a cross-sectional view, comprising a first and a second side wall section, being opposing wall sections, and a bottom section facing the end edge of the tubular body. A draft angle between the bottom section and the first side wall section may be within the range of from zero to ten degrees, optionally within the range of from zero to five degrees. Since the tubular body wall is formed by a paperboard blank and thus a thin rectangular cross section, a draft angle within the range of from zero to ten degrees, or within the range of from zero to five degrees, will enable a tight fit between the tubular body, the bottom section and the first side wall section. This promotes a durability and packaging safety for the packaged goods.

A distance between the first side wall section and the second side wall section may vary less than 3 mm along the entire first and second side wall sections. This implies that the first side wall section and the second side wall have a constant distance. The first and second wall sections may therefore align well with the inner and outer surface of the tubular body and thus only leave a minor gap between the tubular and the first side wall section and the second side wall section of the rim.

The rim may comprise an L-shaped connecting portion, as seen in a cross-section view, comprising a first side wall section and a bottom section facing the end edge of the tubular body. The rim may also have a L-shaped cross-section. A draft angle, between the bottom section and the first side wall section, is within the range of from zero to ten degrees, or within the range of from zero to five degrees. The first side wall section may be applied against the inner surface of the tubular body and wherein the first side wall section corresponds to the connecting portion of the rim. This promotes a tight fitting between the L-shaped connecting portion and the tubular body end portion improving the durability of the packaged goods and the packaging safety.

The rim may comprise a guiding side wall section extending from the first connecting portion, such as from the first side wall section. The guiding side wall section is a section having a greater distance to the tubular body than the first connecting portion. The guiding side wall section may be being an inclined wall section with an increasing distance to the tubular body as seen from the end edge of the tubular body and in a longitudinal direction of the tubular body. Since the rim is made from pulp fibers, the structure may be more fragile and less flexible than a plastic rim and may additionally imply a greater friction between the rim and the tubular paperboard body. To reduce the risk of damaging either the rim or the edge portion when attaching the rim to the tubular body, the rim may comprise a guiding side wall section extending from the first side wall section. This may be advantageous when the rim comprises a U-shaped or a square edge U-shaped track portion in which the end portion of the tubular body is inserted.

The tubular body may have a thermoplastic welding layer in a basis weight of at least 15 g/m$^2$, such as within the range of from 20 g/m 2 to 160 g/m$^2$, optionally 35 g/m 2 to 140 g/m$^{2'}$ or 40 g/m 2 to 120 g/m$^2$ on the laminate sheet material. It has been found by the present inventors that such basis weight of the thermoplastic welding layer provides an enhanced welding with a rim comprising pulp fibers. Conventionally, the rim is a plastic rim and welding between the plastic rim and a paperboard container comprising a thermoplastic welding layer is therefore facilitated. However, if the thermoplastic welding layer has such basis weight an improved sealing, being durable and moisture resistant, between the tubular body and the rim according to the present invention may be achieved.

The thermoplastic welding layer may comprise or consist of a polyethylene layer.

The thermoplastic welding layer may comprise a metallic powder dispersed therein or metallised polymers.

The laminate sheet material may comprise a metallic foil layer, such as aluminium foil. The metal foil layer may be arranged between the carton substrate layer and the thermoplastic welding layer. A bonding layer, such as a thermoplastic bonding layer, may be arranged between the metallic foil layer and the carton substrate layer. The metallic foil layer may have a thickness of from 5 micrometer to 30 micrometer, such as from 5 micrometer to 15 micrometer, such as from 5.5 micrometer to 6.5 micrometer.

A laminate body sheet material which may be used in a composite packaging container as disclosed herein may comprise one or more layers in addition to the mandatory structural carton substrate layer and the inner thermoplastic welding layer f) as disclosed below. As seen in order from the outside to the inside, the laminate body sheet material may have the following structure:

a) an optional polymeric coating, such as a laquer,
b) an optional printed and/or coloured layer
c) a carton substrate layer
d) an optional polymeric bonding layer, e.g. a polyethylene (PE) layer
e) an optional barrier layer, e.g. an aluminum (Al) foil barrier layer
f) an inner thermoplastic welding layer, such as a polyethylene (PE) layer. The inner thermoplastic welding layer may consist of two or more sub-layers, such as a polyethylene (PE) layer and a low-density polyethylene (LDPE) layer. The sublayers may be coextruded to form the inside polymeric layer, or may be formed as separate films which are laminated together.

According to a second aspect, the present disclosure relates to a method of producing a composite paperboard container for bulk solids according to any one of the preceding claims, the method comprising the steps of;

a) bending a paperboard laminate sheet material comprising a carton substrate layer and a thermoplastic welding layer into a tube, the tube having a longitudinal direction, a radial direction perpendicular to the longitudinal direction, closing the tube in the longitudinal direction by joining overlapping or abutting side edges of the paperboard material thereby forming a tubular body, the tubular body having an inner surface facing towards an interior of the tubular body and an outer surface facing away from the interior of the tubular body;
b) imparting a predetermined cross-sectional shape to said tube;
c) closing the tubular body at a bottom end over a container bottom opening opposite a container top opening at a top end of the tubular body;
d) providing pulp fibers, such as softwood pulp fibers, into a molding tool thereby forming a three-dimensionally shaped rim component comprising pulp fibers, the rim comprising a connecting portion having a distal edge;
e) providing the rim to an end portion of the tubular body along an end edge of the tubular body so that the rim surrounds the container top opening and/or the container bottom opening, such that that the distal edge of the rim connecting portion is located at a distance from the end edge of the tubular body of at least 4 mm; and
f) attaching the connecting portion of the three-dimensionally formed container component to the end portion of the tubular body by welding, thereby forming the composite paperboard container.

The method may comprise that step d) includes forming the rim such that it comprises a U-shaped or a square edge U-shaped track portion, the U-shaped or square edge U-shaped track portion comprising a first and a second side wall section and a bottom section and wherein step e) includes arranging the rim such that the bottom section faces the end edge of the tubular body.

A draft angle, between the bottom section and the first side wall section, may be within the range of from zero to ten degrees, optionally within the range of from zero to five degrees.

A distance between the first side wall section and second side wall section may vary less than 3 mm along the first and second side wall sections. This implies that the first side wall section and the second side wall section have a constant distance between them and therefore may align with the inner and outer surface of the tubular body, leaving only a minor gap between the tubular body and the first side wall section and the second side wall section of the rim.

The rim may have a density within the range of from 0.2 to 1.5 kg/dm$^3$, optionally within the range of from 0.2 to 1 kg/dm$^3$, optionally within the range of from 0.4 to 0.8 kg/dm$^3$. For rim components which are to be connected to an additional rim part, such as an inner rim component and an outer rim component, the rim components need to have a certain flexibility and to be able to be structurally stable.

DETAILED DESCRIPTION

It is to be understood that the drawings are schematic and that individual components, such as layers of materials and container components are not necessarily drawn to scale. The composite paperboard container and the steps in the method of forming a composite paperboard container shown in the figures are provided as examples only and should not be considered limiting to the invention. Accordingly, the scope of the invention is determined solely by the scope of the appended claims.

Figure 1:
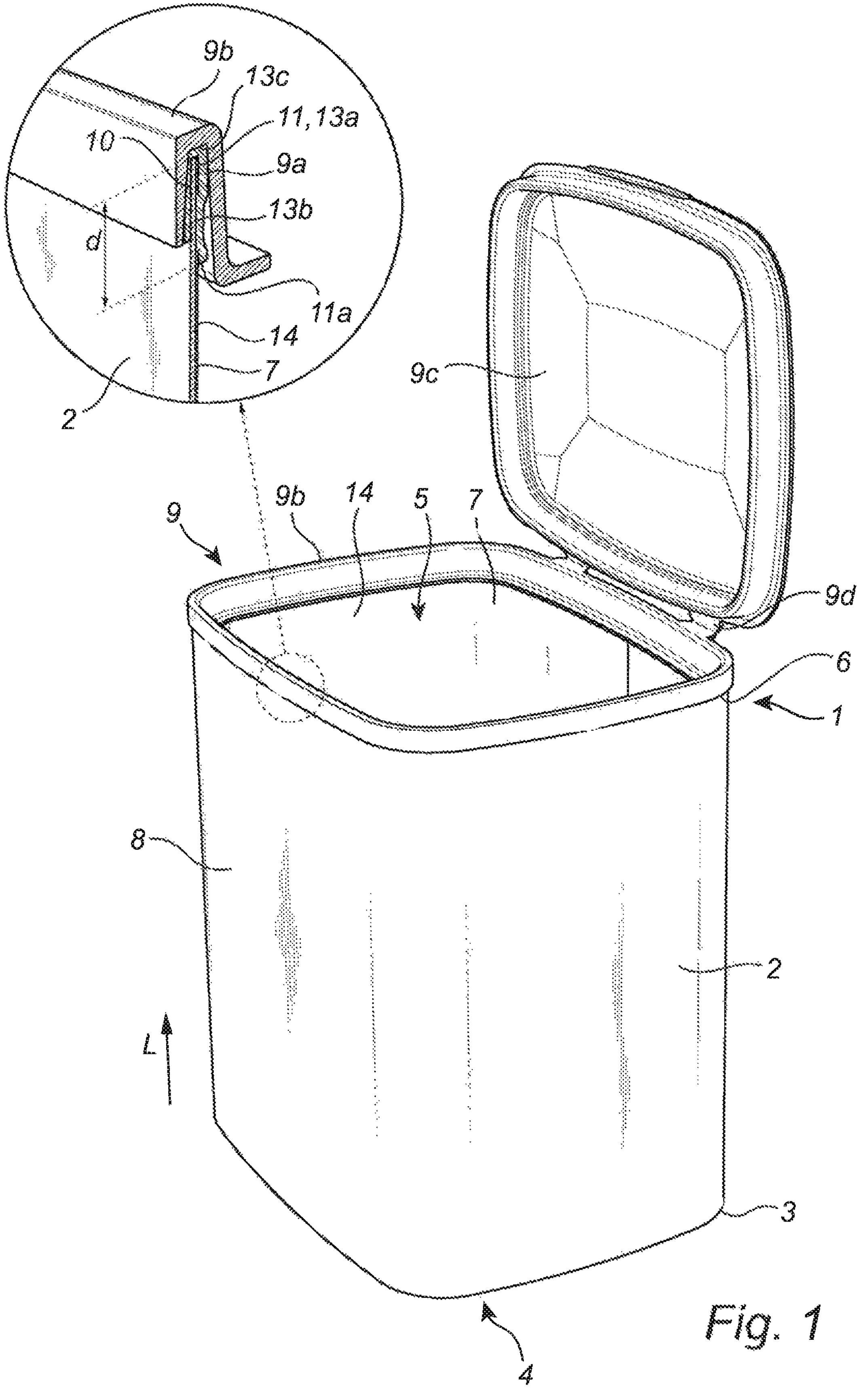
FIG. 1 illustrates a composite paperboard container according to the present disclosure.

FIG. 1 illustrates a composite paperboard container 1 for bulk solids, the composite paperboard container 1 comprising a tubular body 2 being closed at a bottom end 3 over a container bottom opening 4 opposite a container top opening 5 at a top end 6 of the tubular body 2. The tubular body 2 has an inner surface 7 facing towards an interior of the container body 2 and an outer surface 8 facing away from the interior of the container body 2. The tubular body 2 extends in a longitudinal direction L between the bottom end 3 and the top end 6. The composite container 1 comprises a rim 9 surrounding the container top opening 5. The rim 9 is a molded inner rim 9*a* comprising pulp fiber, such as softwood pulp fibers. The inner rim 9*a* is attached to the tubular body 2 by welding a connecting portion 11 of the inner rim 9*a* to an end portion 10 of the tubular body 2 along an end edge 12 of the tubular body 2. The connecting portion 11 of the inner rim 9*a* has a distal edge 11*a*, the rim is located at a distanced from the end edge 12 of the tubular body within the range of from 4 mm to 50 mm.

The composite container 1 furthermore comprises a lid component including an outer rim part 9*b* and a lid part 9*c*. The outer rim part 9*b* and the lid part 9*c* are moulded in one piece. The outer rim part 9*b* is connected to the lid part 9*c* via hinge portions 9*d*. The outer rim part 9*b* is connected to the inner rim 9*a*, the outer rim part 9*b* may be connected by a snap-on function, a slide-in connection, by means of adhesive or any other suitable means. The lid component is made from the same material as the inner rim 9*a*.

The inner rim 9*a* comprises a square edge U-shaped track portion 13, as seen in a cross-section view, comprising a first and a second side wall section 13*a*,13*b* and a bottom section 13*c* facing the end edge 12 of the tubular body 2. The first side wall section 13*a* corresponds to the connecting portion 11 of the inner rim 9*a*. However, the inner rim may have an L-shaped cross-section, with a first side wall section corresponding to the connecting portion of the rim and a bottom section arranged to face the end edge 12 of the tubular body 2.

The tubular body 2 is made from a laminate sheet material comprising a carton substrate layer and a thermoplastic welding layer 14.

Figure 2:
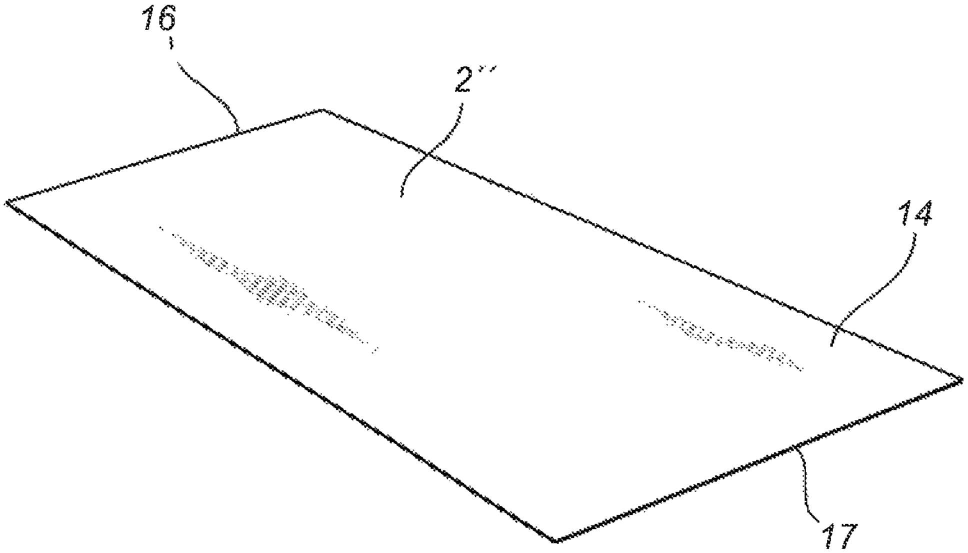
FIG. 2 illustrates a paperboard blank.
Figure 3:
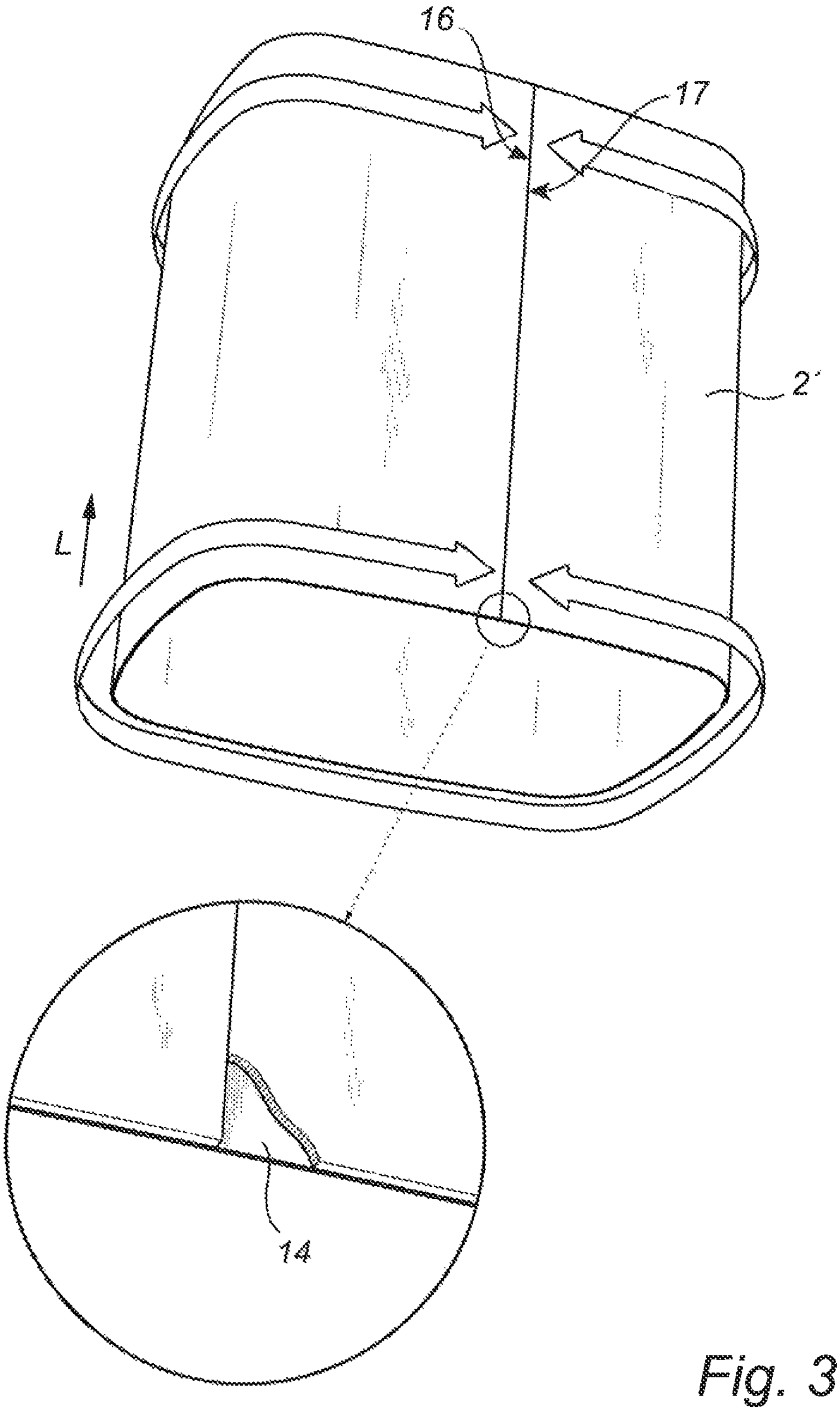
FIG. 3 illustrates folding of the paperboard blank to a tubular body.

FIGS. 2 to 9 show a method of producing a composite paperboard container 1 for bulk solids. FIG. 2 illustrates a paperboard laminate sheet material 2" comprising a carton substrate layer and a thermoplastic welding layer 14. The laminate sheet material 2" has opposing side edges 16,17. FIG. 3 shows a first step a) of bending the paperboard laminate sheet material 2" into a tube 2', the tube 2' having a longitudinal direction L, and closing the tube 2' in the longitudinal direction L by joining abutting side edges 16,17 of the paperboard material 2" and thereby forming a tubular body 2. The join between the side edges 16,17 may be covered by a sealing strip. The side edges 16,17 may alternatively be joined being overlapping. The tubular body 2 formed has an inner surface 7 facing towards an interior of the tubular body 2 and an outer surface 8 facing away from the interior of the tubular body 2. The thermoplastic welding layer 14 of the laminate sheet material is arranged on the inner surface 7 of the tubular body 2. The tube is shaped to have a predetermined cross-sectional shape. In the example shown in the figures, the cross-sectional shape is a modified rectangular shape with rounded corners. It is to be understood that the tubular body may have any useful cross-sectional shape such as circular shape, oval shape, or any polygonal or modified polygonal shape such as triangular shape, square shape, pentagonal shape, etc.

Figure 4:
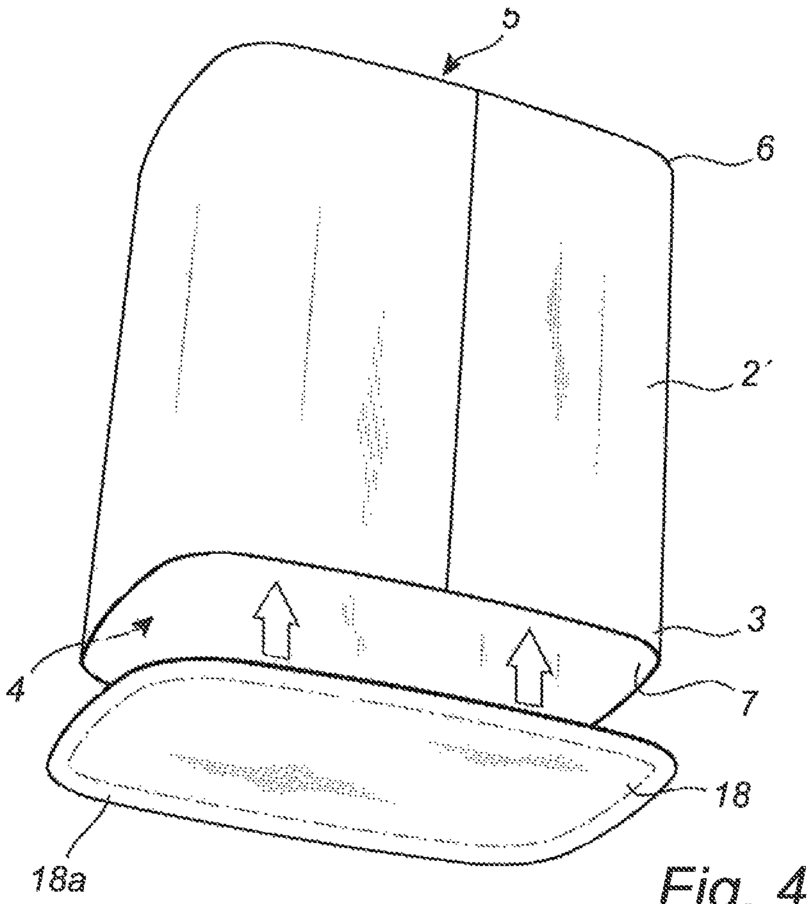
FIGS. 4-5 illustrate inserting a paperboard disc into the tubular body thereby forming a container bottom.
Figure 5:
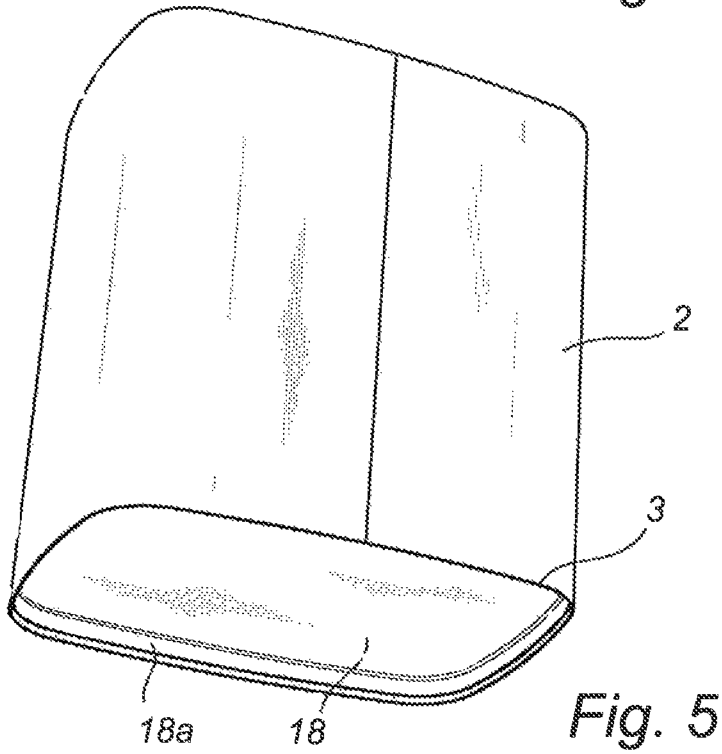

FIGS. 4 and 5 illustrate a step c) of closing the tubular body 2 at a bottom end 3 over a container bottom opening 4 opposite a container top opening 5 at a top end 6 of the tubular body 2. The bottom opening 4 is closed by pressing by pressing a paperboard bottom disc 18 into the tube at the bottom end 3. The bottom disc 18 has a peripheral flange 18*a* being flexed towards the bottom end 3 in the longitudinal direction L. The flexed peripheral flange 18*a* may be attached to the inner surface 7 of the tubular body 2 for example by welding. The paperboard bottom disc 18 may be constituted of a laminate sheet material comprising a carton substrate layer and a thermoplastic welding layer. A bottom rim may be applied to the bottom end 3 of the tubular body, the bottom rim may be a molded rim comprising pulp fibers according to the present disclosure and may be applied by welding according to the present disclosure or may be adhesively attached.

Figure 6:
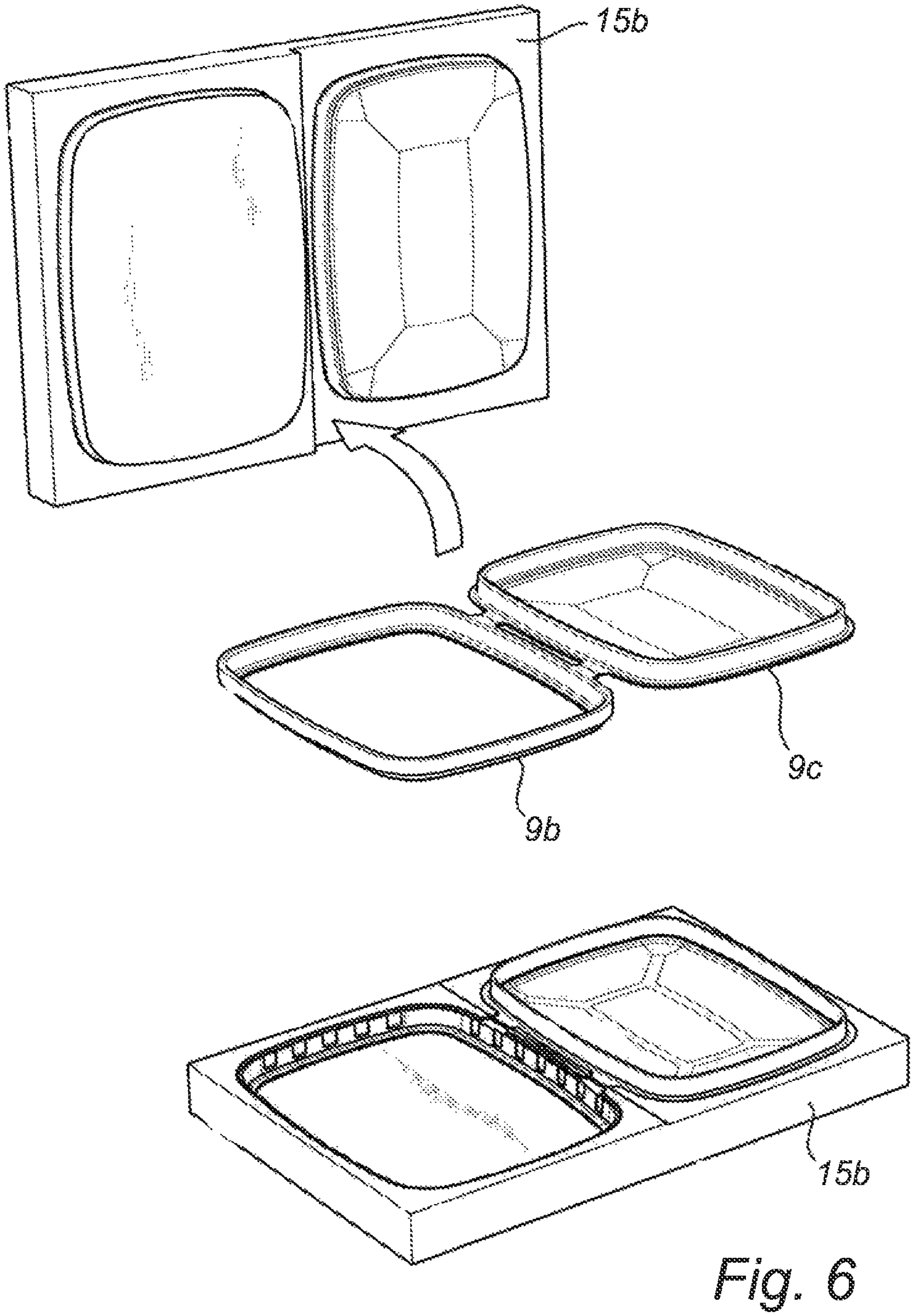
FIG. 6 illustrates molding of pulp fibers to form a rim and lid component.

FIG. 6 illustrates a step of forming the lid component including the outer rim part 9*b* and the lid part 9*c*. The molded outer rim and lid part are formed by providing softwood pulp fibers, such as in the form of a pulp slurry, in a molding tool 15. The molding tool 15 comprises a female molding tool component 15*a* and a mating male molding tool component 15*b* between which the pulp fibers are pressed to form a three-dimensionally shaped lid component comprising pulp fibers. The inner rim 9*a* (illustrated in FIG. 7 being molded in a corresponding manner).

Figure 7:
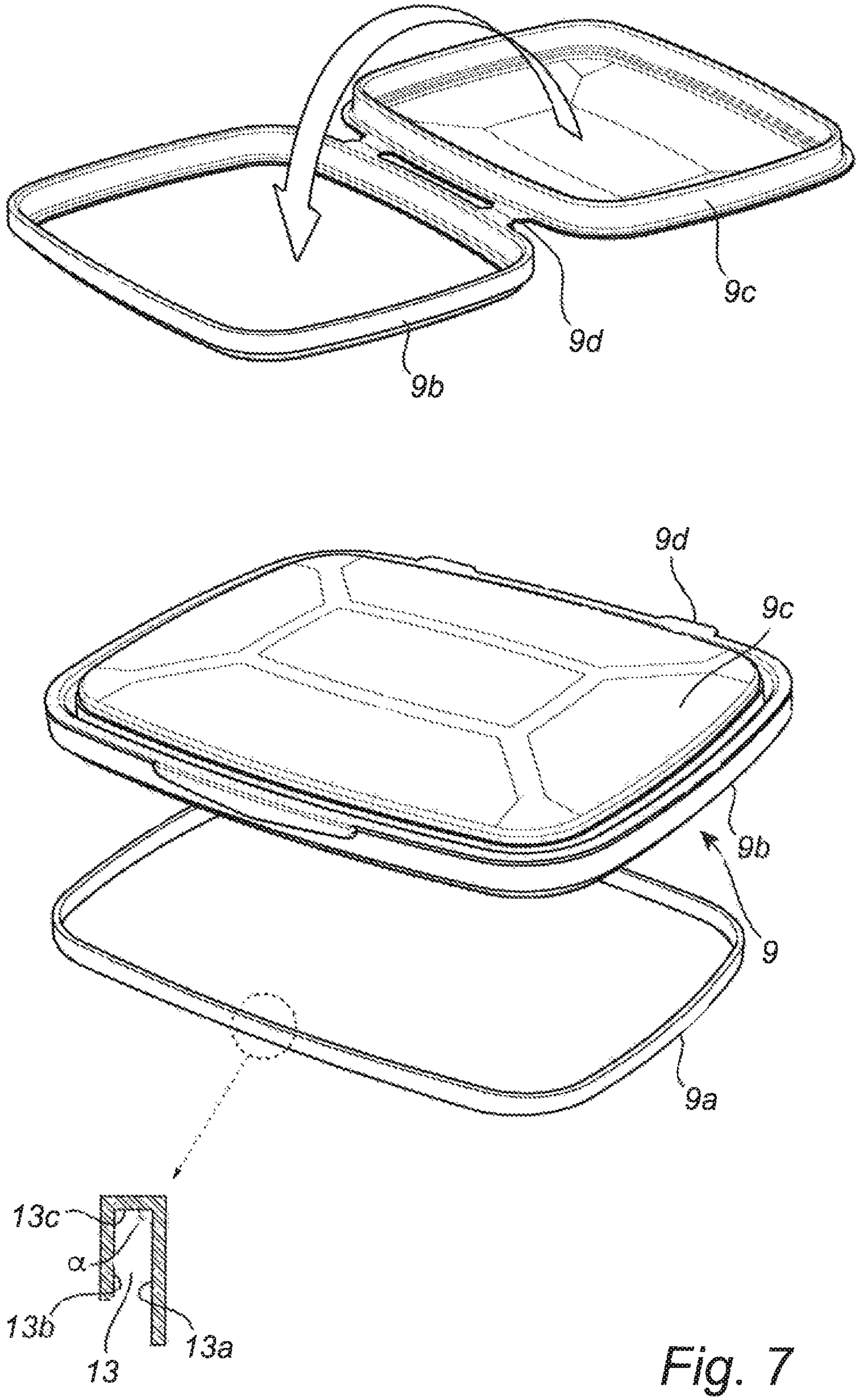
FIG. 7 illustrates the molded rim comprising an inner rim component and an outer rim and lid component.

FIG. 7 illustrates an inner rim 9*a* and a lid component including an outer rim part 9*b* and a lid part 9*c* molded in one piece and the outer rim component 9*b* being connected to the lid component 9*c* via two hinge portions 9*d*.

The inner rim 9*a* has a square U-shaped track portion 13, as seen in a cross-section view, comprising a first and a second side wall section 13*a*,13*b* and a bottom section 13*c*, intended to face the end edge 12 of the tubular body 2. The first side wall section 13*a* corresponds to the connecting portion 11 of the inner rim 9*a*. However, the rim may equally be of an L-shape, with a first side wall section corresponding to the connecting portion of the rim and a bottom section intended to face the end edge 12 of the tubular body 2. A draft angle $\alpha$, between the bottom section 13*c* and the first side wall section 13*a*, is within the range of from zero to ten degrees.

Figure 8:
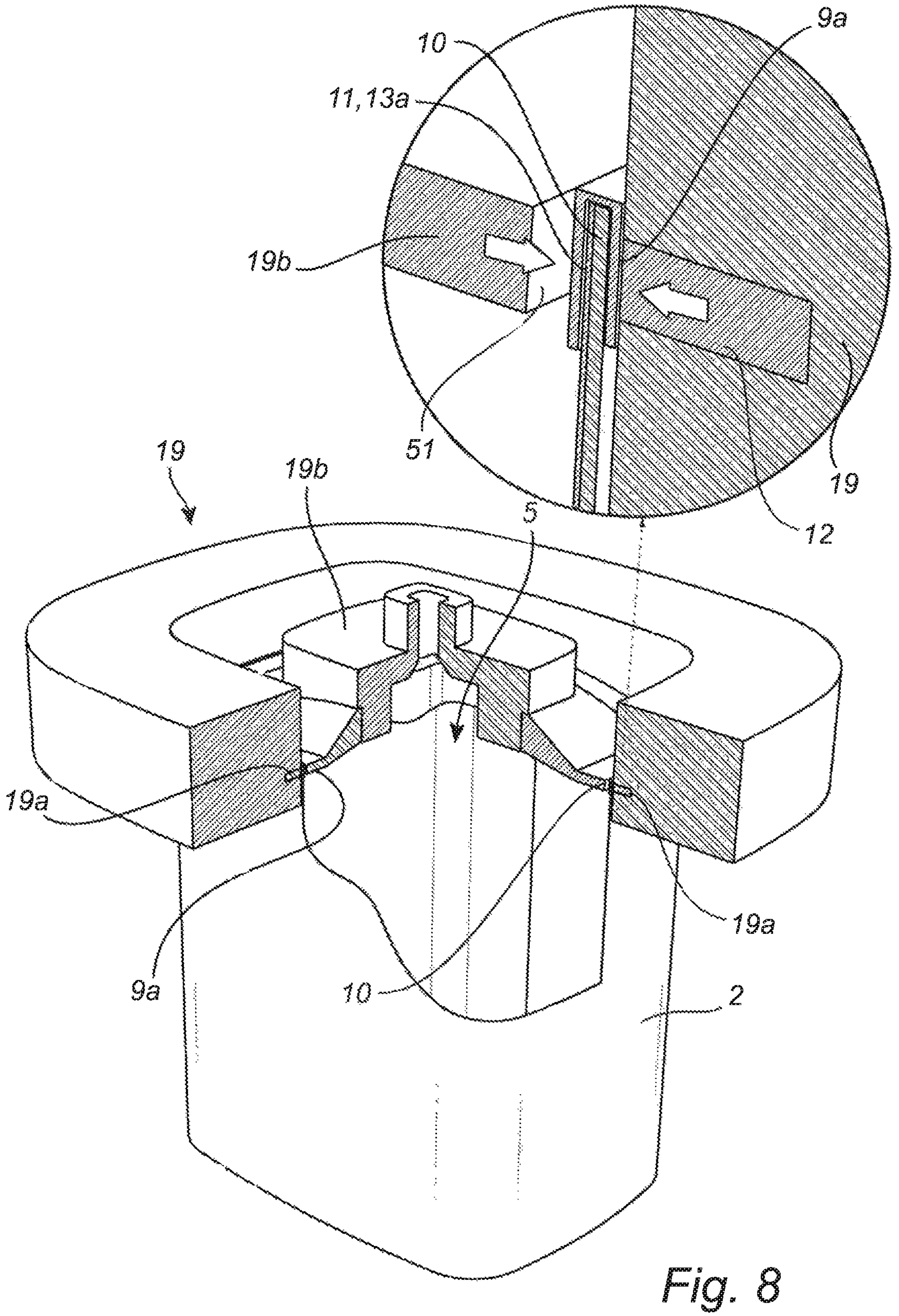
FIG. 8 illustrates attaching the inner rim component to the tubular body by welding.

FIG. 8 illustrates a step of attaching the inner rim 9*a* by means of welding the inner rim 9*a* to the end portion 10 of the tubular body 2 along the end edge 12 of the tubular body 2, so that the inner rim 9*a* surrounds the container top opening 5. The welding is in this figure performed by a welding unit 19 comprising an induction coil 19*a* and a press plunger 19*b*.

The welding unit 19 comprises a high frequency induction welding unit comprising an induction coil 19*a*. The press plunger 19*b* comprises an expandable welding tool 51 which is transformable between an unexpanded state, and a radially expanded state.

In the expanded state, a cross-sectional area (footprint) delimited by the outer circumference of the welding tool 51 is larger than in the unexpanded state of the welding tool 51.

When the press plunger 19*b* is inserted into the tubular body 2 with the welding tool 51 in the attachment position for the inner rim 9*a*, the welding tool 51 is transformed to the expanded state.

In the expanded state of the welding tool 51, an edge portion of the outer circumference of the welding tool 51 contacts the inner rim 9*a* which is inserted into the tubular body 2 and exerts pressure on the inner rim 9*a* such that it is pressed against the inside of the tubular body 2 and can be induction welded to the inside of the tubular body 2 by activating the induction coil 19*a*.

Figure 9:
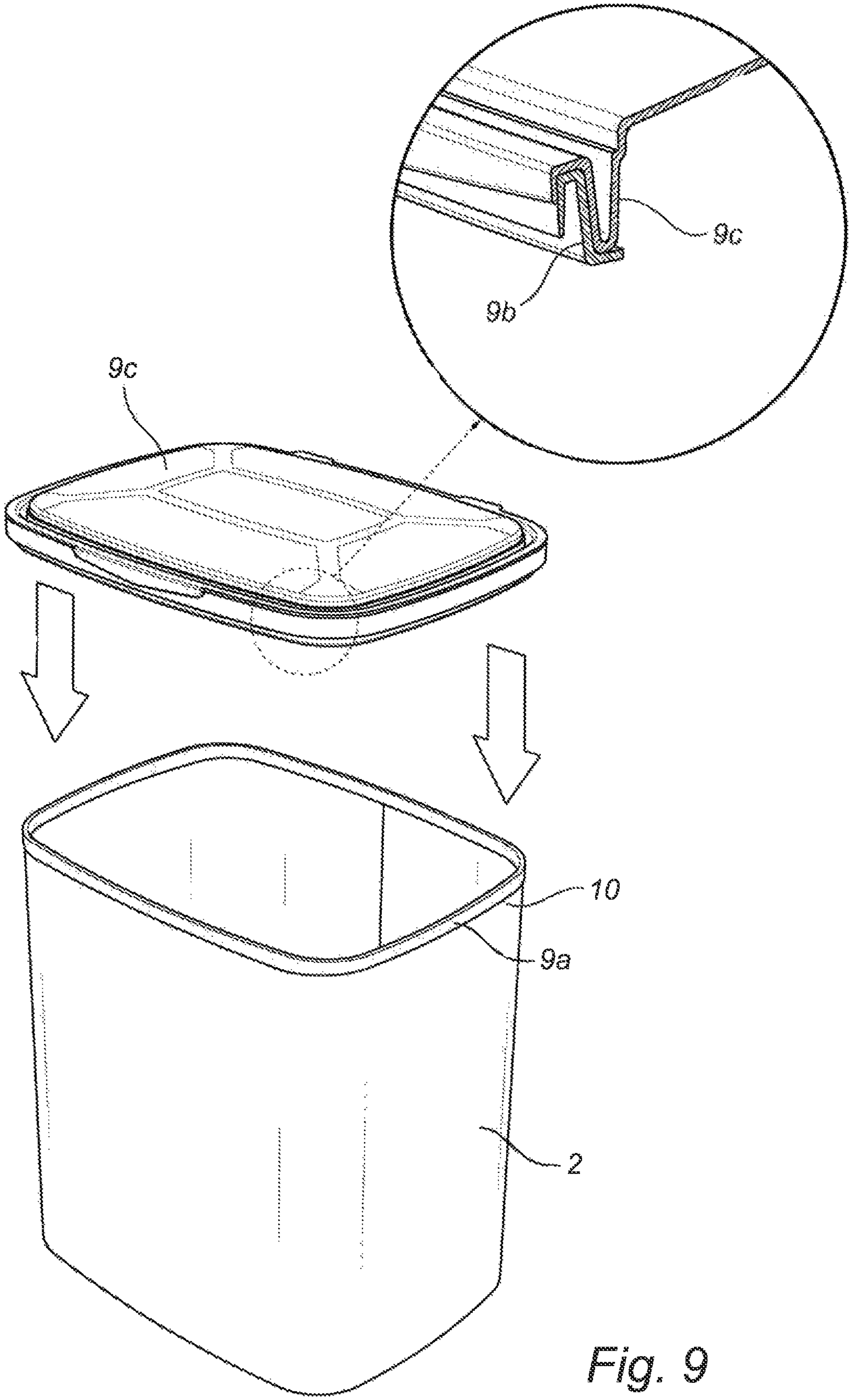
FIG. 9 illustrates attaching the outer rim and lid component to the inner rim component and thereby forming a composite paperboard container prepared by the method according to the present disclosure.

FIG. 9 illustrates when the inner rim 9*a* is attached to the end portion 10 of the tubular body 2 and the step of attaching the outer rim and lid parts 9*b*,9*c* to the inner rim 9*a* by a snap-fit attachment.

The invention claimed is:

1. A composite paperboard container for bulk solids, the composite paperboard container comprising a tubular body being closed at a bottom end over a container bottom opening opposite a container top opening at a top end of the tubular body, the tubular body having an inner surface facing towards an interior of the container body and an outer surface facing away from the interior of the container body, the tubular body extending in a longitudinal direction, the composite container comprises a rim surrounding one of the container top opening and the container bottom opening, the rim being attached at a connecting portion of the rim to an end portion of the tubular body along an end edge of the tubular body, the connecting portion of the rim has a distal edge, the tubular body being made from a laminate sheet material comprising a carton substrate layer and a thermoplastic welding layer, wherein the rim is a molded rim comprising pulp fibers, the tubular body is connected by welding to the connecting portion of the rim and the distal edge of the rim is located at a distance from the end edge of the tubular body of at least 4 mm as seen in the longitudinal direction of the tubular body, the rim comprises a U-shaped or a square edge U-shaped track portion comprising a first and a second side wall section and a bottom section facing the end edge of the tubular body, and wherein a draft angle, between the bottom section and the first side wall section, is within the range of from zero to ten degrees.

2. The composite paperboard container according to claim 1, wherein the rim is an inner rim and the composite paperboard container comprises a lid component being a molded lid component comprising pulp fibers, the lid component including an outer rim part and a lid part, wherein the outer rim part and the lid part are moulded in one piece, the outer rim part being connected to the lid part via a hinge portion and wherein the outer rim part connectable to the inner rim.

3. The composite paperboard container according to claim 1, wherein the composite paperboard container is free from plastic components attached to the tubular body.

4. The composite paperboard container according to claim 1, wherein rim has a density within the range of from 0.2 to 1.5 kg/dm3.

5. The composite paperboard container according to claim 1 wherein the rim comprises an L-shaped connecting portion comprising a first side wall section and a bottom section facing the end edge of the tubular body, and wherein a draft angle, between the bottom section and the first side wall section, is within the range of from zero to ten degrees.

6. The composite paperboard container according to claim 1, wherein the rim comprises a guiding side wall section extending from the first side wall section, the guiding side wall section being an inclined wall section with an increasing distance to the tubular body as seen from the end edge of the tubular body and in the longitudinal direction of the tubular body.

7. The composite paperboard container according to claim 1, wherein the thermoplastic welding layer comprises a polyethylene layer.

8. The composite paperboard container according claim 1, wherein the thermoplastic welding layer has a basis weight of at least 15 $g/m^2$ on the laminate sheet material.

9. The composite paperboard container according claim 1, wherein the laminate sheet material comprises a metallic foil layer.

10. A method of producing a composite paperboard container for bulk solids, the method comprising the steps of;

a) bending a paperboard laminate sheet material comprising a carton substrate layer and a thermoplastic welding layer into a tube, the tube having a longitudinal direction, a radial direction perpendicular to the longitudinal direction, closing the tube in the longitudinal direction by joining overlapping or abutting side edges of the paperboard material thereby forming a tubular body, the tubular body having an inner surface facing towards an interior of the tubular body and an outer surface facing away from the interior of the tubular body;

b) imparting a predetermined cross-sectional shape to said tube;

c) closing the tubular body at a bottom end over a container bottom opening opposite a container top opening at a top end of the tubular body;

d) providing pulp fibers into a molding tool thereby forming a three-dimensionally shaped rim component comprising pulp fibers, the rim comprising a connecting portion having a distal edge;

e) providing the rim to an end portion of the tubular body along an end edge of the tubular body so that the rim surrounds one of the container top opening and the container bottom opening, such that that the distal edge of the rim connecting portion is located at a distance from the end edge of the tubular body within the range of at least 4 mm as seen in the longitudinal direction of the tubular body; and f) attaching the connecting portion of the three-dimensionally formed container component to the end portion of the tubular body by welding, thereby forming the composite paperboard container, step d) includes forming the rim comprising a U-shaped or a square edge U-shaped track portion, the U-shaped or square edge U-shaped track portion comprising a first and a second side wall section and a bottom section and wherein step e) includes arranging the rim such that the bottom section faces the end edge of the tubular body.

11. The method according to claim 10, wherein the rim comprises an L-shaped connecting portion comprising a first side wall section and a bottom section facing the end edge of the tubular body, and wherein a draft angle, between the bottom section and the first side wall section, is within the range of from zero to ten degrees.

12. The method according to claim 10, wherein a draft angle, between the bottom section and the first side wall section, is within the range of from zero to ten degrees.

13. The method according to claim 10, wherein the rim has a density within the range of from 0.2 to 1.5 $kg/dm^3$.

* * * * *